United States Patent
Andersson et al.

(10) Patent No.: US 6,923,512 B2
(45) Date of Patent: Aug. 2, 2005

(54) ARRANGEMENT FOR ENSURING THE FUNCTION OF A VEHICLE BRAKE

(75) Inventors: Håkan Andersson, Sodertalje (SE); Nils-Gunnar Vågstedt, Taby (SE)

(73) Assignee: Scania CV AB (publ) (SE)

( * ) Notice: Subject to any disclaimer, the term of this patent is extended or adjusted under 35 U.S.C. 154(b) by 6 days.

(21) Appl. No.: 10/203,986

(22) PCT Filed: Feb. 13, 2001

(86) PCT No.: PCT/SE01/00281

§ 371 (c)(1), (2), (4) Date: Aug. 14, 2002

(87) PCT Pub. No.: WO01/60668

PCT Pub. Date: Aug. 23, 2001

(65) Prior Publication Data

US 2003/0011243 A1 Jan. 16, 2003

(30) Foreign Application Priority Data

Feb. 14, 2000 (SE) .............................. 0000446

(51) Int. Cl.$^7$ ................................ B60T 8/72
(52) U.S. Cl. .................... 303/174; 303/186; 303/113.5; 303/9.62
(58) Field of Search .............................. 303/123, 154, 303/158, 167, 169, 174, 189, 198, 9.62, 9.66, 186, 187, 113.5, 155

(56) References Cited

U.S. PATENT DOCUMENTS

| | | | | |
|---|---|---|---|---|
| 3,976,860 A | * | 8/1976 | Gerstenmeier et al. | 303/163 |
| 4,080,007 A | * | 3/1978 | Acker et al. | 303/167 |
| 4,321,677 A | * | 3/1982 | Takahashi et al. | 701/75 |
| 4,677,557 A | * | 6/1987 | Stumpe | 701/70 |
| 4,685,745 A | * | 8/1987 | Reinecke | 303/100 |
| 4,720,794 A | * | 1/1988 | Skarvada | 701/74 |
| 4,848,852 A | * | 7/1989 | Inoue et al. | 303/155 |
| 5,438,516 A | * | 8/1995 | Neubauer et al. | 701/70 |
| 5,702,163 A | * | 12/1997 | Stumpe | 303/9.62 |
| 5,752,747 A | * | 5/1998 | Decker et al. | 303/9.62 |
| 5,772,289 A | * | 6/1998 | Nakazawa et al. | 303/9.69 |
| 5,902,019 A | * | 5/1999 | Maron et al. | 303/15 |
| 5,984,433 A | * | 11/1999 | Stumpe et al. | 303/155 |
| 6,238,018 B1 | * | 5/2001 | Sugimoto et al. | 303/146 |
| 6,280,003 B1 | * | 8/2001 | Oshiro et al. | 303/9.62 |
| 6,338,017 B1 | * | 1/2002 | Kato et al. | 701/79 |
| 6,378,957 B1 | * | 4/2002 | V.ang.gstedt | 303/9.62 |

FOREIGN PATENT DOCUMENTS

| | | |
|---|---|---|
| FR | 2334544 | 7/1977 |
| GB | 1523334 | 8/1978 |
| GB | 2042661 | 9/1980 |

* cited by examiner

Primary Examiner—Matthew C. Graham
Assistant Examiner—Mariano Sy
(74) Attorney, Agent, or Firm—Ostrolenk, Faber, Gerb & Soffen, LLP

(57) ABSTRACT

An arrangement for ensuring the functioning of a brake configuration for a vehicle with a multiplicity of wheels which are arranged on a front axle and at least one rear axle and which support the vehicle. The brake configuration incorporates at least two brake devices, each to act upon one of the wheels, and a brake control with which the brake devices can be activated with a total brake action. A memory stores at least one value of a parameter for the brake devices. The parameter relates to at least one previous braking operation performed by the respective brake device. A control unit distributes the brake action to the brake devices, taking into account the value of the parameter of the respective brake devices when the brake control is actuated. The brake devices are disc brakes. The value of the parameter indicates to what extent a film has accumulated on the brake lining surfaces which come into contact with the respective discs, which film reduces the friction between discs and brake linings at least incipiently. If the value indicates that such a film has formed, the whole or a major portion of the brake action called for by the driver, i.e. the total brake action, is distributed to the disc brakes whose value of the parameter indicates the presence of such a film.

14 Claims, 2 Drawing Sheets

ARRANGEMENT FOR ENSURING THE FUNCTION OF A VEHICLE BRAKE

BACKGROUND TO THE INVENTION, AND STATE OF THE ART

The present invention relates to an arrangement for ensuring the functioning of a brake by distribution of braking action selectively to the vehicle wheel configuration for a vehicle.

That the brakes of a vehicle, e.g. a heavy vehicle, function as intended is of the greatest importance, particularly today, when the total weights of heavy vehicle combinations (e.g. truck and trailer) are increasing and hence also the axle pressures of the respective vehicle combinations. In addition, average speeds are higher and timetables tighter. Traffic density is increasing. All this results in heavy demands upon the brake systems of heavy vehicles, particularly that they should function as intended.

Conventional trucks use pneumatic configurations for controlling the braking process. More recent trucks use electronics for controlling the braking process. Compressed air is only used for applying the wheel brakes, which may include disc brakes or drum brakes, one wheel brake for each wheel. The driver of a heavy vehicle can communicate with the electronically controlled brake system via some brake control, preferably the brake pedal. Such electronically controlled brake systems may also incorporate load sensors designed to measure, for example, the vehicle's respective axle weights or total weight. The electronically controlled brake system is designed to communicate with the pneumatic configuration which is designed to control the brake cylinders of the respective wheel brakes. The brake cylinders are connected to the friction linings of the respective wheel brakes which are intended to act upon, for example, a brake disc or a brake drum. In such electrically controlled brake systems, all the wheel brakes are usually applied simultaneously. However, the brake system may be designed in such a way that the brake pressure delivered to one wheel brake of the vehicle differs from the brake pressure delivered to another wheel brake of the same vehicle, with a view to maintaining vehicle stability. This method is used in order, inter alia, to prevent skidding and overturning of the vehicle, e.g. if the brake action called for by the driver on a sharp bend would result in too much brake action on an individual axle, the brake system may be designed in such a way that the brake action called for is limited. Electronically controlled brake systems of the aforesaid type may also incorporate ABS control, i.e. the brake action called for by the driver being limited by the available friction between ground and tires with a view to preventing wheel locking. In addition, an electronic brake system of the aforesaid type may incorporate functions to prevent wheel spin. Many electronically controlled brake systems incorporate at least one additional brake, e.g. a retarder which generates an outward braking moment by means of, for example, viscous friction. Such a retarder may be arranged to brake the universal shaft of the vehicle concerned. Further examples of supplementary brakes which may be included in an electrically controlled brake system are exhaust brakes and compression brakes which increase the engine's natural braking effect.

Light braking and recurring light braking by means of the wheel brakes, particularly where the wheel brakes incorporate disc brakes, may reduce the friction between discs and linings. This may lead to the driver finding the vehicle difficult to brake and hence possibly to the driver pressing the brake pedal harder, which may lead to unnecessarily great brake action, so-called overbraking.

Said reduction in friction between discs and brake linings depends on the brake lining material. The reduction in friction may be due, inter alia, to changes in the brake lining material which may arise because of low thermal and mechanical loading, particularly during light braking. This may result in the formation of a film which accumulates on the brake lining surfaces. The film accumulating on the brake lining surfaces which make contact with the disc causes reduction in friction between discs and brake linings. It is also possible for brake lining material to react with the road surface, e.g. with salts, in which case a film may form and accumulate on the brake lining surfaces and hence reduce the friction between discs and brake linings. Said film may thus, at least at an initial stage of brake application, reduce friction between brake linings and brake devices.

SUMMARY OF THE INVENTION

The object of the present invention is to provide an arrangement by which the problems associated with reduced friction between discs and linings of a disc brake are eliminated.

This object is achieved with the invention which relates to an arrangement for ensuring the functioning of a brake configuration for a vehicle with a multiplicity of wheels which are arranged on a front axle and on at least one rear axle and which support the vehicle. The brake configuration incorporates at least two brake devices, each to act upon one of the wheels, and a brake control with which the brake devices can be activated with a total brake action. A memory unit stores at least one value of a parameter for the brake devices. The parameter relates to at least one previous braking operation that was performed by the respective brake device. A control unit distributes the brake action to the brake devices, taking into account the value of the parameter of the respective brake devices when the brake control is actuated. The brake devices are preferably disc brakes. The value of the parameter indicates to what extent a film has accumulated on the brake lining surfaces which come into contact with the respective discs, which film reduces the friction between the discs and brake linings at least incipiently. If the value indicates that such a film has formed, the whole or a major portion of the brake action called for by the driver, i.e. the total brake action, is distributed to the disc brakes whose value of the parameter indicates the presence of such a film.

Such an arrangement, which may incorporate a computer and is designed to store at least one value of a parameter for each brake device, said parameter being related to at least one previous braking operation performed by the respective brake device, makes it possible by means of the control unit to distribute the brake action called for by the driver to said brake device, taking into account the value of said parameter of the respective brake device. Said parameter which relates to at least one previous braking operation performed by the respective brake device may be created in various ways. In addition, the value of the parameter of the respective brake device indicates the extent to which any film has accumulated on the brake linings of the respective brake device. This will be discussed in more detail below. Particularly in the case of disc brakes there is a tendency for a film to be able to accumulate on the linings of disc brakes and reduce the friction between discs and brake linings, resulting in the disc brakes not being able to provide maximum brake action.

When the value of the parameter of a respective brake device indicates that a film has accumulated on the brake lining surfaces, particularly the contact surfaces, the control unit of the arrangement may be designed to deliver a larger proportion of the brake action called for by the driver to that brake device. Delivering a larger proportion of the brake action to that brake device will result in the development of a higher temperature than if the brake action was uniformly distributed over all the brake devices. This higher temperature is capable of removing said film, and consequently the brake device concerned can thereafter provide maximum brake action. It should be noted that the arrangement according to the invention may be applied on vehicles whose wheel brakes consist of both drum brakes and disc brakes, but brake devices in said patent application refers preferably to disc brakes.

As mentioned above, said parameter may be created in various ways and the arrangement according to the invention incorporates means designed to calculate the value of said parameter. According to one embodiment of the invention, said parameter is formed on the basis of the actual brake action from the respective brake device and the desired brake action from the respective brake device. A braking operation may entail different brake pressures being delivered to the various wheel brakes, inter alia in order, as previously mentioned, to maintain vehicle stability. In addition, the desired brake action from the respective wheel brake, i.e. the brake action expected from the respective wheel brake when a certain brake pressure is delivered to it, is calculated on the basis of the vehicle's weight and the brake pressure delivered to the respective wheel brake. The vehicle's actual brake action, i.e. the brake action resulting from the brake pressure delivered, may thus differ from the desired brake action. This difference may be due to a film having accumulated on the brake lining surfaces of the respective wheel brake which are intended to abut against, for example, a disc. The film reduces the friction between brake linings and discs and prevents the achievement of desired brake action. The actual brake action may be calculated, e.g. on the basis of the retardation of the wheel which the respective brake device is intended to act upon. According to a further embodiment of the invention, said parameter is formed on the basis of brake power supplied to the respective brake device and the time when said brake power is delivered to the respective brake device. Low brake pressure delivered to a certain brake device for a prolonged period is a particular case of risk that a film of the aforesaid kind may form on that brake device.

According to a further embodiment of the invention, the control unit incorporates a comparison unit in which a predetermined value of said parameter is stored, and if the value of said parameter of one of the respective brake devices corresponds to or exceeds said predetermined value the control unit is designed to distribute the whole or a major portion of said brake action to that brake device when the brake control is actuated.

Consequently and as mentioned previously, the control unit may be designed to distribute the whole or a major portion of the brake action called for by the driver to the brake device whose value of said parameter is the most critical. If the value of said parameter for all the brake devices corresponds to or exceeds said predetermined value, the control unit may be designed to distribute the whole or a major portion of said brake action to one of said brake devices at a time. The purpose of this is to enable the heat developed at the time of braking to eliminate the film accumulated on the brake lining surfaces of the respective brake device, after which that brake device can provide maximum brake action. According to a further embodiment of the invention, the control unit may be designed to distribute the whole or a major portion of said brake action to that brake device upon recurring actuation of the brake control.

According to one embodiment of the invention, the brake configuration incorporates at least four brake devices, each designed to act upon one of said wheels. All the wheels of heavy trucks may be provided with a disc brake. According to one embodiment of the invention the control unit is designed to distribute the whole or a major portion of the brake action called for by the driver (also called the total brake action) to the brake device which is arranged on the axle which includes the wheel which the brake device whose value of said parameter corresponds to or exceeds said predetermined value is designed to act upon. Distributing the brake action to the brake devices on the same axle maintains the vehicle's stability.

The object of the arrangement is, as previously mentioned, to ensure the functioning of a brake configuration of a vehicle, i.e., as previously mentioned, to ensure that respective disc brakes can provide the desired brake action. To make this possible, the control unit is designed to distribute the brake action called for in proportion to the value of said parameter of respective brake devices. However, the distribution of brake action does not take place in such a way as to jeopardise the vehicle's stability, as the magnitude of the brake action distributed to the respective brake devices is limited in such a way as to maintain the vehicle's stability. The brake action distributed to the respective brake devices is also limited in such a way as to take into account the available friction between ground and tires.

BRIEF DESCRIPTION OF THE DRAWINGS

The present invention will now be explained by describing a preferred embodiment with reference to the attached drawings.

DETAILED DESCRIPTION OF AN EMBODIMENT OF THE INVENTION

Figure 1:
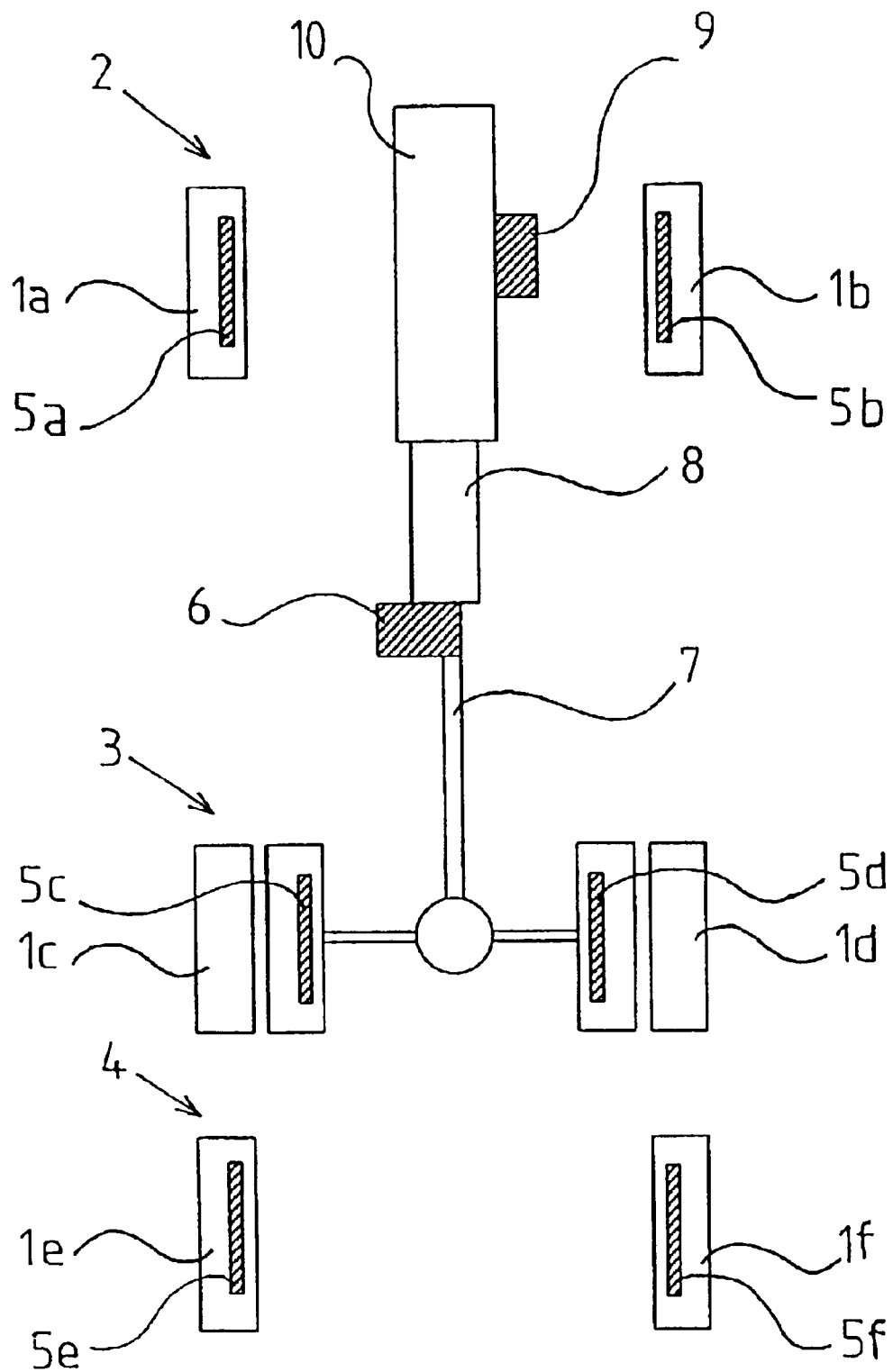
FIG. 1 depicts schematically a brake configuration for a heavy vehicle.

FIG. 1 depicts schematically a brake configuration of a heavy vehicle such as a truck with a multiplicity of wheels 1a–f which are arranged with reference to a front axle 2 and two rear axles 3, 4 and which support the vehicle. The brake configuration of the vehicle includes a main brake which incorporates brake devices 5a–f designed to act upon the vehicle's wheels 1a–f. The brake devices 5a–f may include pneumatic disc brakes, in which case the main brake includes the equipment required for applying the brake linings of the respective disc brakes to the discs which rotate with the respective wheels 1a–f. The brake configuration of the vehicle includes a supplementary brake in the form of a retarder 6 which generates outward braking moment by means of viscous friction. The retarder 6 is connected to the universal shaft 7 and the vehicle's gearbox 8 and only brakes the powered wheels 1c–d. In addition, the vehicle incorporates a further supplementary brake in the form of an exhaust brake 9. The exhaust brake 9 is connected to the vehicle's engine 10.

Figure 2:
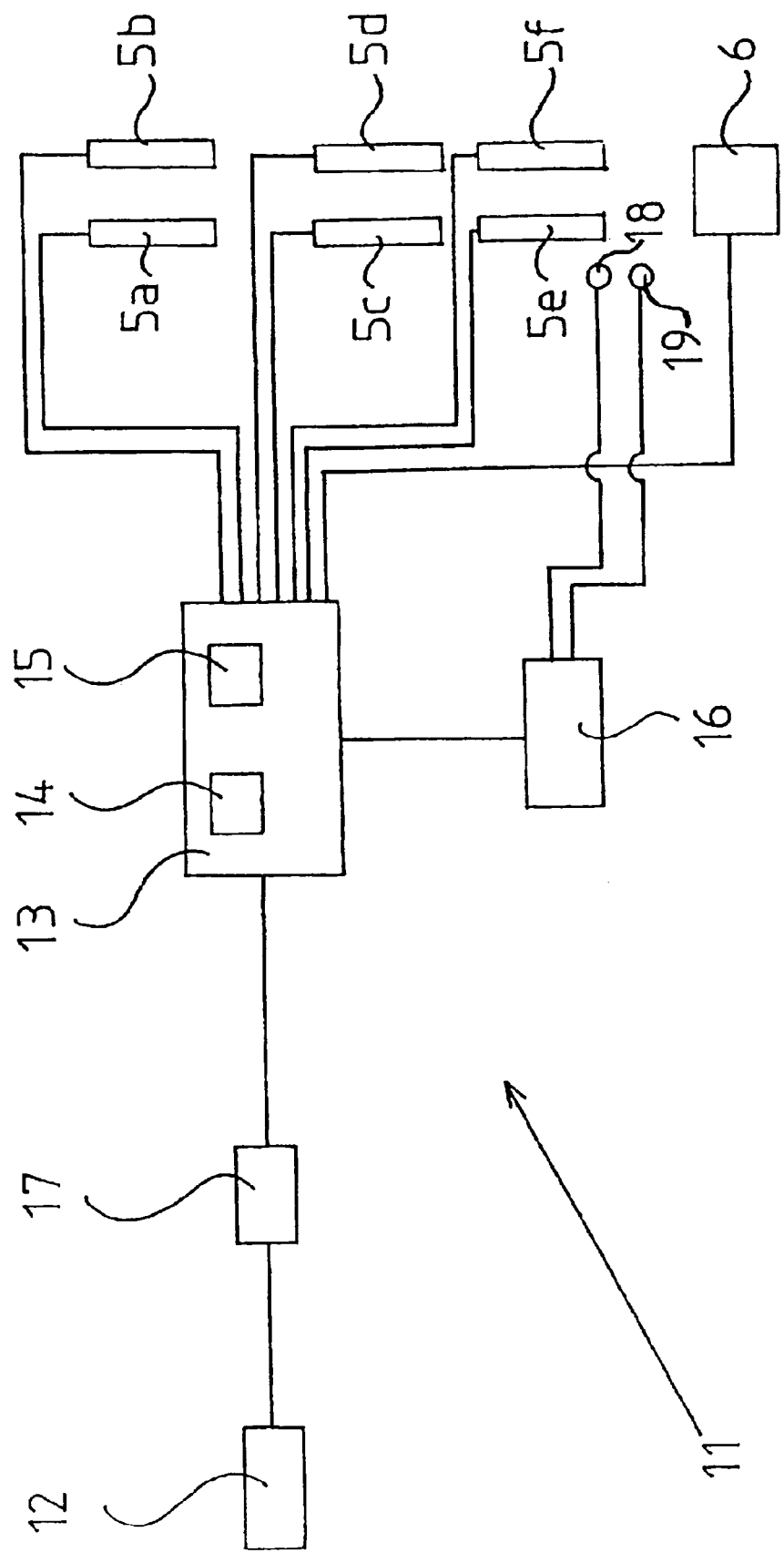
FIG. 2 depicts schematically an embodiment of an arrangement according to the present invention.

FIG. 2 depicts an arrangement 11 for controlling the brake configuration of a heavy vehicle such as a truck according to an embodiment of the invention. Only the wheel brakes, i.e. in this case the brake devices 5a–f which include disc brakes and the retarder 6 of the brake configuration appear in FIG. 2. It should be noted that the brake configuration might also include the exhaust brake 9. Reference 12 denotes a brake control which may incorporate the brake pedal by which the brake devices 5a–f and the retarder 6 can be activated and by means of which a driver can call for a brake action of the vehicle, a so-called total brake action of the vehicle. The arrangement 11 includes a control unit 13 which may incorporate a computer, a memory unit 14, a comparison unit 15, computing means 16 and a sensor 17. How the constituent parts of the arrangement 11 according to FIG. 2 cooperate will be described in more detail later on in the description. It should be noted that the arrangement 11 according to the invention is also applicable to other types of vehicle, e.g. passenger cars, other types of freight vehicles, buses and similar utility vehicles.

The brake pedal 12 defines the brake action of the vehicle called for by the driver, i.e. the total brake action of the vehicle. The sensor 17 is designed to continuously detect the brake action called for by the driver and transmit to the control unit 13 a signal which corresponds to the total brake action.

Upon light braking, the control unit 13 may be designed to distribute the whole of the brake action called for by the driver to the retarder 6. However, the control unit 13 may be designed also to distribute the brake action to the disc brakes 5a–f. Light braking of a vehicle by means of disc brakes entails risk that a film may accumulate on brake lining contact surfaces as previously mentioned in the introductory description, resulting in the disc brakes not providing the desired brake action. To ensure that the disc brakes 5a–f function as intended, the computing means 16 are designed to calculate a value of a parameter for all the disc brakes 5a–f, which parameter relates to at least one previous braking operation performed by the respective disc brakes 5a–f. The parameter may be formed in various ways. The parameter may be formed on the basis of the actual brake action from respective brake devices 5a–f and the desired brake action from respective brake devices 5a–f. The desired brake action, i.e. the brake action expected from a respective wheel brake when a certain brake pressure is distributed to it, may be calculated on the basis of the brake pressure delivered to respective disc brakes 5a–f and the vehicle's actual weight with reference to respective disc brakes 5a–f. At the same time, load sensors 18, only one of which appears in FIG. 2, may be designed to detect the axle load of respective disc brakes 5a–f. The control unit 13 and the computing means 16 are thus designed to communicate with said load sensors 18. The actual brake action from respective disc brakes 5a–f, i.e. the brake action resulting from the brake pressure delivered to respective disc brakes 5a–f, may thus differ from the desired brake action. This difference may be due to a film having accumulated on the brake lining surfaces of the respective disc brake which are intended to abut against the disc. The actual brake action may for example be calculated on the basis of the retardation of the wheel 1a–f which the respective disc brake 5a–f is intended to act upon. At the same time, detection means 19, only one of which for one of the respective wheels appears in FIG. 2, are designed to detect the retardation of the respective wheels 1a–f. Thus the control unit 13 and the calculating means 16 are designed to communicate with said detection means 19. A further way of forming said parameter may be on the basis of brake power supplied to respective disc brakes 5a–f and the time when said brake power is delivered to respective brake devices 5a–f.

On the occasion of a braking operation the computing means 16 are designed to calculate a value of the parameter for respective disc brakes 5a–f. These values are stored in the memory unit 14. At the time of the next braking operation the comparison unit 15, in which a predetermined value of said parameter is stored, is designed to compare the value stored in the memory unit 14 of the parameter of respective disc brakes 5a–f with the predetermined value, and if a value of the parameter of one of the disc brakes 5a–f corresponds to or exceeds the predetermined value, the control unit 13 may be designed to distribute the whole or a major portion of the brake action called for by the driver, i.e. the total brake action, to that disc brake. Consequently the brake linings of that disc brake will be applied with greater force, resulting in the development of a higher temperature capable of removing the film accumulated on that disc brake's linings. The magnitude of the brake action distributed by the control unit 13 to a disc brake 5a–f is limited in such a way as, inter alia, not to jeopardise the vehicle's stability. The control unit 13 may possibly be designed to distribute the whole or a major portion of the brake action to the disc brakes which are arranged with reference to one and the same axle 2, 3, 4 in order to avoid jeopardising the vehicle's stability.

The invention is not limited to the embodiment depicted but may be varied and modified within the scopes of the ensuing patent claims.

What is claimed is:

1. A motor vehicle, comprising:
   a front axle;
   at least one rear axle;
   a plurality of wheels on the front axle and the at least one rear axle, the wheels on the axles supporting the vehicle;
   a brake configuration comprising a plurality of braking devices respectively assigned to and adapted to act upon at least a plurality of the wheels;
   an arrangement for ensuring the functioning of the brake configuration comprising:
     a brake control connected with the braking devices to activate the braking devices with a total brake action;
     a calculating device for calculating an actual value of a parameter for each of the braking devices a function of a desired braking action and an actual braking action measured during at least one previous braking operation of the respective braking device;
     a memory adapted for storing the actual value of the parameter for each of the braking devices; and
     a control unit connected with the memory and operable to distribute the brake action to the plurality of braking devices in accordance with the actual value of the parameter for each of the braking devices stored in the memory.

2. The motor vehicle of claim 1, wherein each parameter is formed on the basis of brake power supplied to the respective braking device and on the basis of the time when the brake power is delivered to the respective braking device.

3. The motor vehicle of claim 1, wherein the control unit comprises a comparison unit which stores a predetermined value of the parameter and which senses the actual value of the parameter at the respective braking devices, such that if the actual value of the parameter of one of the plurality of braking devices either corresponds to or exceeds the predetermined value, the control unit is operable to distribute at least a major portion of the brake action to the braking device having the actual value of the parameter corresponding to or exceeding the predetermined value when the brake control is actuated.

4. The motor vehicle of claim 3, wherein if the value of the parameters for all of the plurality of braking devices either corresponds to or exceeds the predetermined value, the control unit is operable to distribute at least a major portion of the brake action to one of the plurality of braking devices at a time.

5. The motor vehicle of claim 3, wherein the control unit is operable to distribute at least a major portion of the brake action to the braking device having the actual value of the parameter corresponding to or exceeding the predetermined value upon recurring action of the brake control.

6. The motor vehicle of claim 3, wherein the brake configuration includes at least four of the braking devices and the control unit is operable to distribute at least a major portion of the brake action to the braking device having the actual value of the parameter corresponding to or exceeding the predetermined value.

7. The motor vehicle of claim 1, wherein the control unit is operable to limit magnitude of the brake action to maintain vehicle stability.

8. The motor vehicle of claim 1, wherein the braking devices include disc brakes.

9. A method of ensuring the functioning of a brake configuration of a motor vehicle, wherein the motor vehicle has a front axle, at least one rear axle and a plurality of wheels on the front axle and on the at least one rear axle, and a plurality of braking devices respectively assigned to and adapted for acting upon each of at least a plurality of the wheels, the method comprising:

activating the braking devices with a total brake action;

calculating a value of a parameter by comparing information based on an actual brake action of the respective braking device and a desired brake action of the respective braking device;

storing at least one value of the parameter for each of the braking devices relating to at least one previous braking operation that had been performed by the braking device; and using the at least one stored value to distribute the brake action to the plurality of braking devices taking into account the value of the parameter of the respective braking devices at the time of using the at least one stored value, wherein the brake action is distributed to the braking devices in accordance with the value of the parameter.

10. The method of claim 9, wherein each parameter is formed on the basis of brake power supplied to the respective braking device and on the basis of the time when the brake power is delivered to the respective braking device.

11. The method of claim 9, further comprising storing a predetermined value of the parameter; sensing the value of the parameter at the respective braking devices, and if the value of the parameter of one of the respective braking devices either corresponds to or exceeds the predetermined value, distributing at least a major portion of the brake action to the one braking device.

12. The method of claim 11, wherein if the value of the parameters for all of the braking devices either corresponds to or exceeds the predetermined value, upon sensing of the values of the parameters, distributing at least a major portion of the brake action to one of the plurality of the braking devices at a time.

13. The method of claim 11, further comprising distributing at least a major portion of the brake action to the one braking device.

14. The method of claim 9, further comprising limiting the magnitude of the brake action to maintain vehicle stability.

* * * * *